Oct. 25, 1955    J. A. SALVADORE ET AL    2,721,604
ADJUSTABLE TRACTOR SEAT
Filed May 4, 1953

INVENTORS
JOSEPH A. SALVADORE
ALLEN L. CLOUGH
BY
Charles R. Fay, atty.

United States Patent Office 2,721,604
Patented Oct. 25, 1955

2,721,604

ADJUSTABLE TRACTOR SEAT

Joseph A. Salvadore and Allen L. Clough,
South Barre, Mass.

Application May 4, 1953, Serial No. 352,621

1 Claim. (Cl. 155—95)

This invention relates to a new and improved adjustable tractor seat and the principal object of the invention resides in the provision of extremely simply operated means for adjusting the rotative position of the seat, even while the operator occupies the seat, in such a manner that the operator does not have to lean from the seat and may control the tractor at the same time that he is accomplishing the adjustment.

Another object of the invention resides in the provision of an angularly rotatable tractor seat comprising a disc removably bolted to the tractor frame on the usual bar supporting the seat, said disc being bolted in fixed position and cooperating with a second disc located and supported thereon, the first disc being provided with a series of holes therein arranged in a circle and the second disc having a manually operated lift-up type of plunger for locking the seat in angularly adjustable relation by providing for the plunger to be seated in a selected hole in the first disc.

Other objects and advantages of the invention will appear hereinafter.

Reference is to be had to the accompanying drawings, in which

Figure 1:
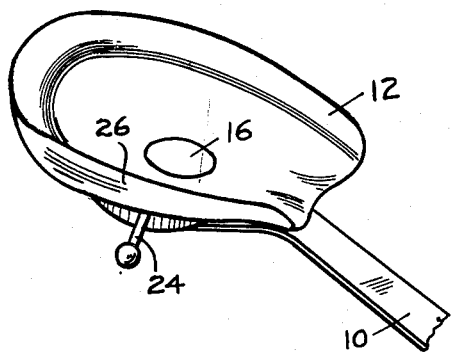
Fig. 1 is a perspective view illustrating the novel seat.

As shown in the drawings, the reference numeral 10 indicates the usual bar for supporting the conventional tractor seat and in this case this seat may be of any desired or conventional form and may take the form of the saddle generally indicated at 12.

This seat is bolted to a circular block or support 14 located generally centrally thereof in combination with a plate 16 in the seat shown in Fig. 1. The circular block 14 is securely bolted to the tractor seat as, for instance, by bolt 18 and this block is provided with a radially arranged vertical slot 20 opening at an edge of block 14 and providing for reception of a handle 24 pivoted on a cross pin 22. The handle 24 pivots on the pin in a vertical plane and the handle terminates at a point which is not beyond the extreme edge of the tractor seat at 26, so that there is no possibility of interference on the part of the handle with the operation of the tractor. If the handle 24 were to extend beyond the seat to any great extent, it might come in contact with parts of the tractor in certain angular positions of adjustment of the seat.

Centrally of block 14 there is provided an axial relatively large bearing pin 28 provided with a head 30 and a stepped or reduced portion 32 terminating in a threaded part 34 receiving a nut 36. The reduced part forms a shoulder 37 for a purpose to be described. The head 30 is retained by undercut shoulders in block 14 as clearly seen in Fig. 2, and the nut 36 provides against dislodgment of any of the parts of the apparatus, including the tractor seat, while providing for rotation of the tractor seat as will be made clear hereinafter.

The handle 24 is provided with a vertical plunger 38 having an aperture therethrough for reception of the handle as indicated at 40. The plunger 38 is capable of vertical movement according to movement of the handle under influence of the operator sitting in the seat. The plunger extends downwardly into a bore 42 located near the edge of a circular plate or disc 44 through which passes the circular pin 28. This pin maintains plate 44 centrally located.

Figure 2:
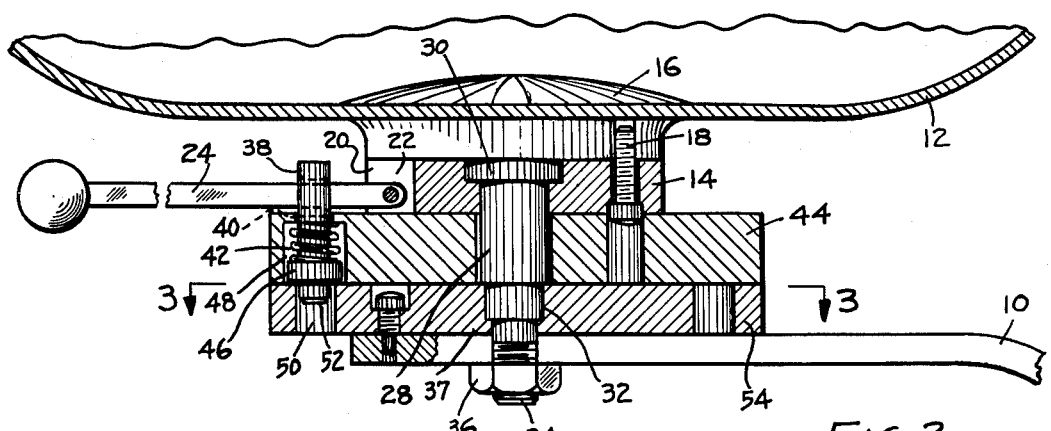
Fig. 2 is a sectional view therethrough on an enlarged scale.
Figure 3:
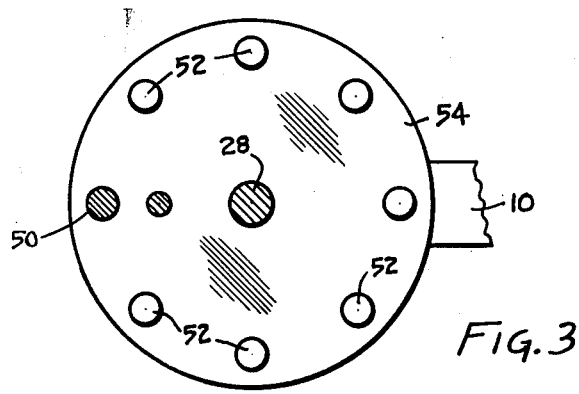
Fig. 3 is a sectional view on line 3—3 of Fig. 2.

The plunger 38 is provided with a head 46 and a spring 48, said spring yieldingly holding the plunger 38 in downward position as shown in Fig. 2, so that the lower end of the plunger at 50 extends into one of a series of bores or holes 52 in a plate or disc 54 located on the bar 10. The disc 54 may be located in any desired manner but in any event it is fixed to the bar 10 and the plate 44, block 14 and seat 12 pivot as a unit about the pin 28, the reduced end portion 32 of which passes centrally through plate 54. The shoulder 37 and the nut 36 help to fix plate 54 to the supporting bar 10.

The operation of the device will be seen to be very simple. The operator sitting in the seat 12 may merely drop his right hand upon the handle 24 and raise the same a very slight extent, whereupon the seat may be turned on plate 54 to the desired location. As soon as plunger 38 is released from its hole, the handle may be released, in which case the plunger will be forced down into the next hole. On the other hand, the operator may hold the plunger up until the approximate location is desired and then when the handle is released, a slight continued rotary motion of the seat will cause the plunger to lock into the next succeeding hole 52 in plate 54.

Having thus described our invention and the advantages thereof, we do not wish to be limited to the details herein disclosed, otherwise than as set forth in the claim, but what we claim is:

An adjustable tractor seat comprising a circular plate for securement to a support, a center bearing pin in the plate, a second circular plate on the first plate and angularly movable relative thereto about the pin as an axis, a circular series of holes in the first plate, said holes being arranged vertically and adjacent the periphery of said first plate, said holes being parallel to the central pin, a hole in the second plate, a plunger vertically and axially movable in the hole in the second plate, a block on the second plate, a vertically swingable handle on the block, said plunger being engaged by the handle for movement therewith, means fixing the block to the seat for unitary rotary motion of the seat, the block and the second-named plate, said plunger being seated in any selected hole in the first plate, said central pin having an enlarged head thereon at one end thereof, a shoulder in the block, the head engaging the shoulder, said pin having a reduced portion extending through the first-named plate and a threaded portion extending through the support, and means securing and holding the pin relative to the support and the reduced portion of the pin to the first plate.

References Cited in the file of this patent

UNITED STATES PATENTS 1,877,895    Kohler _____ Sept. 20, 1932